United States Patent [19]
Gonzalez

[11] Patent Number: 6,008,553
[45] Date of Patent: Dec. 28, 1999

[54] LINEAR MOTOR WITH NEGATIVE PRESSURE COOLING CIRCUIT

[75] Inventor: Cesar Gonzalez, Troy, Mich.

[73] Assignee: Ford Global Technologies, Inc., Dearborn, Mich.

[21] Appl. No.: 09/157,183

[22] Filed: Sep. 18, 1998

[51] Int. Cl.⁶ .................................................. H02K 41/00
[52] U.S. Cl. ................................................ 310/12; 310/54
[58] Field of Search ................................ 310/12, 13, 14, 310/57, 58, 87, 54

[56] References Cited

U.S. PATENT DOCUMENTS 4,707,628  11/1987  Obley .......................................... 310/89
5,751,077   5/1998  Gonzalez ................................... 310/12

*Primary Examiner*—Elvin Enad
*Assistant Examiner*—Judson H. Jones
*Attorney, Agent, or Firm*—Mark S. Sparschu; Roger L. May

[57] ABSTRACT

An apparatus and method for cooling a linear motor armature assembly is provided for maintaining minimal separation between a motor housing and a magnet plate, wherein the motor housing has a housing opening formed at a side of the motor housing facing the magnet plate. The method includes: a) covering the housing opening with a thin sheet of non-magnetic material having a thickness of less than approximately 0.015 inch to enclose the coil assembly within the motor housing; and b) drawing a cooling fluid through the motor housing to create a negative pressure within the cooling fluid and to cool the coil assembly.

5 Claims, 1 Drawing Sheet

LINEAR MOTOR WITH NEGATIVE PRESSURE COOLING CIRCUIT

TECHNICAL FIELD

The present invention relates to a linear motor and, more specifically, to a fully enclosed linear motor armature in which the armature is flooded with an electrically nonconductive fluid such as oil for cooling wherein the cooling oil is provided with a negative pressure.

BACKGROUND OF THE INVENTION

Many manufacturing applications require the generation of a linear force for moving of machine equipment. Conventional AC and DC motors produce a rotary torque about an axis which must be converted into a linear force before it can be used in such applications. Such conversion is accomplished by a screw and nut, a sheave and cable, or a rack and pinion, among other designs. These designs are problematic in that they tend to wear out relatively quickly, and they are incapable of producing high linear speeds.

Linear motors are also known which directly product a linear force in response to an electric input. Typically, a linear motor takes advantage of the variable magnetic reluctance produced in the vicinity of slots in a pole face of a magnetic member. An armature of a magnetic material, having windings therein, is urged to step from position to position along the pole face as defined by the slots or, alternatively, the magnetic member is movable while the armature is stationary.

In such designs, the armature portion usually comprises a coil disposed within a lamination stack and surrounded by an epoxy block. A cooling tube is typically provided adjacent the epoxy block for drawing heat from the armature.

The force which such linear motors are capable of producing is limited by resistive heating in the windings of the armature of the motor. The normally used copper cooling tube requires mechanical retention within the epoxy case, and provides somewhat limited armature cooling capacity because the epoxy itself acts as an insulator for the coil assembly. By reducing heat dissipation, performance of the linear motor is adversely affected, and the forward thrust capability declines.

Accordingly, it is desirable to provide an improved armature design with increased cooling capacity.

My U.S. Pat. No. 5,751,077, which is hereby incorporated by reference in its entirety, provides an improvement over the above-referenced linear motors by providing a linear motor with an armature which is fully enclosed within a sealed metal case, and an electrically nonconductive fluid is circulated within the case in direct contact with the lamination stack for cooling the lamination stack and coil assembly. The metal case is sealed by means of a thin cover which is positioned directly adjacent the magnetic plate. The spacing between the magnet plate and the sealed metal case is critical and preferably maintained at approximately less than 0.040 inch to maintain high forces.

A problem with this design is that when cooling fluid is forced through the sealed metal case, the pressure of the fluid tends to bubble up the thin cover, which may cause the cover to actually contact the magnet plate, which will adversely affect operation because the rubbing of the cover against the magnet plate can cause damage, such as chipping and scraping, and the resulting metal chips or shavings may cause further operational problems.

DISCLOSURE OF THE INVENTION

The present invention overcomes the above-referenced shortcomings of prior art linear motors by providing a linear motor with an armature which is fully enclosed within a sealed metal case by a thin cover, and an electrically nonconductive fluid is circulated within the case in direct contact with the lamination stack and the electrically nonconductive fluid has a negative pressure to prevent bubbling of the thin cover. In this manner, minimal spacing may be maintained between the magnet plate and the sealed metal case.

More specifically, the present invention provides a method of cooling a coil assembly within a motor housing while maintaining minimal separation between the motor housing and a magnet plate, wherein the motor housing has a housing opening formed at a side of the motor housing facing the magnet plate.

The method includes: a) covering the housing opening with a thin sheet of non-magnetic material having a thickness of less than approximately 0.015 inch to enclose the coil assembly within the motor housing; and b) drawing a cooling fluid through the motor housing to create a negative pressure within the cooling fluid and to cool the coil assembly.

Preferably, the thin sheet comprises a steel component approximately 0.010 inch thick, and the magnet plate is spaced approximately 0.030 inch from the thin sheet.

Accordingly, an object of the invention is to provide an improved method and apparatus for cooling a linear motor assembly wherein a minimal separation distance is maintained between the motor housing and a magnet plate.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
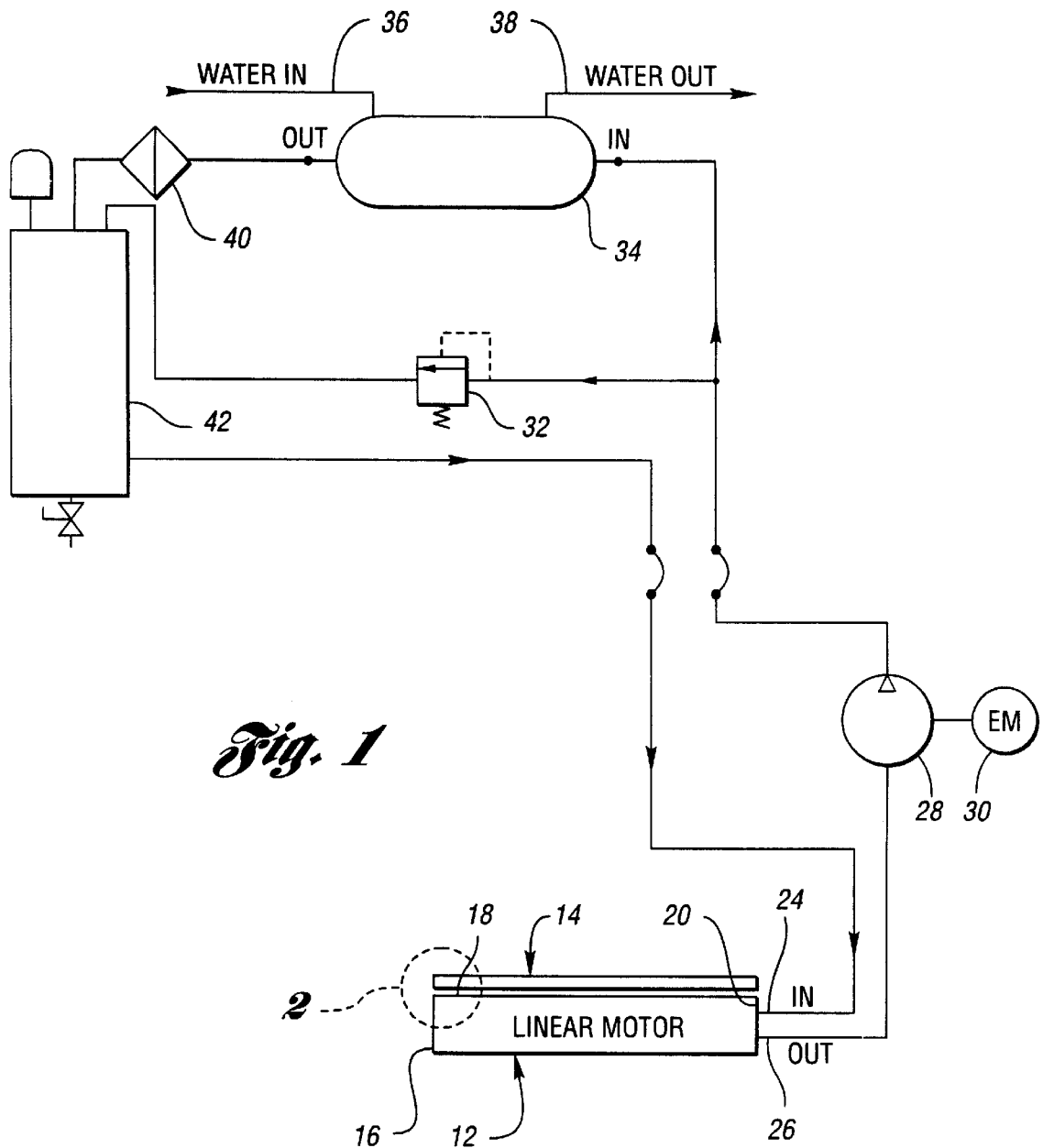
FIG. 1 shows a schematic of a linear motor assembly in accordance with the present invention.
Figure 2:
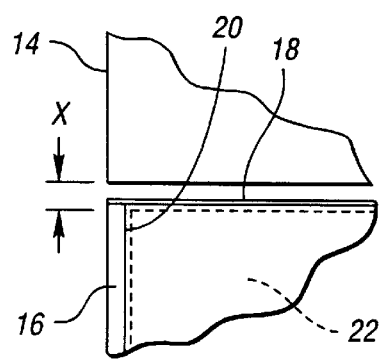
FIG. 2 shows an enlarged view of area 2 identified in FIG. 1.

Referring to FIG. 1, a schematic diagram is shown of a linear motor assembly 10 in accordance with the present invention. As shown, the linear motor 12 and magnet plate 14 are positioned closely adjacent each other for relative movement. The linear motor 12 includes a housing 16 and a cover 18, which covers the housing opening 20, as shown in FIG. 2. A coil assembly 22 is positioned within the housing 16.

As shown in FIG. 2, the separation distance between the magnet plate 14 and the coil assembly 22 is critical, and preferably less than approximately 0.040 inch. Therefore, the cover 18 is preferably a very thin steel sheet, having a thickness of approximately 0.010 inch. This dimension is non-critical. The thin sheet cover 18 is preferably laser welded about its periphery to the housing 16, and may be further attached to the housing 16 at other locations as well.

The housing 16 is flooded with a cooling fluid, such as oil, for cooling the coil assembly 22. As shown in FIG. 1, the cooling fluid enters the fluid inlet 24, and exits the fluid outlet 26. The fluid is actually drawn through the outlet 26 by the pump 28 to create a negative pressure within the fluid so that the thin cover 18 does not bubble upwardly toward the magnet plate 14. The pump 28 is preferably a Tuthill oil circulating pump with "automatic reversing feature", commonly available from Industrial Air & Hydraulics Equipment of Detroit, Mich. The pump displacement will be dependent on the size and number of linear motors connected in parallel. The pump is preferably a 4.9 GPM Tuthill reversing pump, commonly available from Industrial Air and Hydraulic Equipment of Detroit, Mich. An electric motor 30 is provided for driving the pump 28. The motor horsepower will be dependent on the size of the required pump. To minimize weight, a motor specification of 1725 rpm & 460 VAC is recommended.

As shown in FIG. 1, a relief valve 32 and oil cooler 34 are connected in parallel to the pump 28. The relief valve 32 simply protects the oil cooler 34 in situations where pressure is too high. The oil cooler 34 is preferably a Young "shell & tube type", commonly available from Industrial Air & Hydraulics Equipment of Detroit, Mich. The cooler capacity will be dependent on the size and number of linear motors connected in parallel. The oil cooler 34 is provided with a water inlet tube 36 and water outlet tube 38 for providing fresh cooled water to the cooler 34. A filter 40 is provided in series with the oil cooler 34 for filtering metal chips or other debris from the cooling fluid. The filter 40 and relief valve 32 are in fluid communication with a hydraulic reservoir 42, which is positioned vertically above the linear motor 12 so that the fluid naturally flows down into the linear motor housing 16, thereby providing a flooded inlet 24.

The negative pressure created by the pump 28 draws the fluid from the inlet 24 toward the outlet 26, thereby resulting in a unidirectional coolant flow which ensures that the cover 18 will not be exposed to inadvertent pressure spikes.

While the best mode for carrying out the invention has been described in detail, those familiar with the art to which this invention relates will recognize various alternative designs and embodiments for practicing the invention within the scope of the appended claims.

What is claimed is:

1. A method of cooling a coil assembly within a linear motor housing while maintaining minimal separation between the motor housing and a magnet plate, wherein the motor housing has a housing opening formed at a side of the motor housing facing the magnet plate, the method comprising:
    a) covering the housing opening with a thin sheet of non-magnetic material having a thickness of less than approximately 0.015 inch to enclose the coil assembly within the motor housing; and
    b) drawing a cooling fluid through the motor housing to create a negative pressure within the cooling fluid and to cool the coil assembly.

2. The method of claim 1, wherein said covering step comprises covering the housing opening with a steel sheet having a thickness of approximately 0.010 inch.

3. A linear motor assembly comprising:
    a motor housing having a coil assembly therein, said housing having a housing opening covered by a thin sheet of non-magnetic material having a thickness of less than approximately 0.015 inch, said housing further having a cooling fluid inlet and a cooling fluid outlet formed therein;
    a magnet plate positioned closely adjacent said thin sheet; and
    a pump connected to said outlet for drawing cooling fluid through the housing for cooling the coil assembly and for creating a negative pressure within the cooling fluid.

4. The linear motor assembly of claim 3, wherein said thin sheet comprises a thickness of approximately 0.010 inch and said magnet plate is spaced approximately 0.030 inch from the thin sheet.

5. The linear motor assembly of claim 4, wherein said thin sheet of non-magnetic material comprises steel.

\* \* \* \* \*